US010404687B2

(12) United States Patent
Malkapuram et al.

(10) Patent No.: US 10,404,687 B2
(45) Date of Patent: Sep. 3, 2019

(54) METHOD AND SYSTEM FOR PROVIDING A PRE-LAUNCHED VIRTUAL DESKTOP SESSION

(71) Applicant: Wipro Limited, Bangalore (IN)

(72) Inventors: Siva Prasad Malkapuram, Hyderabad (IN); Narasimha Sekhar Kakaraparthi, Hyderabad (IN); Praveen Kumar Daduy, Bellevue, WA (US)

(73) Assignee: Wipro Limited, Bangalore (IN)

( * ) Notice: Subject to any disclaimer, the term of this patent is extended or adjusted under 35 U.S.C. 154(b) by 166 days.

(21) Appl. No.: 15/387,903

(22) Filed: Dec. 22, 2016

(65) Prior Publication Data

US 2018/0183775 A1    Jun. 28, 2018

(51) Int. Cl.
   *H04L 29/06*        (2006.01)
   *G06F 21/31*        (2013.01)
           (Continued)

(52) U.S. Cl.
   CPC ............ *H04L 63/083* (2013.01); *G06F 9/452* (2018.02); *G06F 11/301* (2013.01);
           (Continued)

(58) Field of Classification Search
None
See application file for complete search history.

(56) References Cited

U.S. PATENT DOCUMENTS 9,172,724 B1 * 10/2015 Reddy ..................... H04L 63/20
2013/0007465 A1 * 1/2013 Movassaghi .......... H04L 63/105
                                                         713/186

(Continued)

FOREIGN PATENT DOCUMENTS

WO    WO 2016/032858      3/2016
WO    WO 2016/053787      4/2016

OTHER PUBLICATIONS

David Gaunt, https://www.citrix.com/blogs/2012/02/10/a-field-guide-to-xenapp-session-pre-launch/, "A Field Guide to XenApp 6.5 Session Pre-Launch", Feb. 10, 2012, pp. 1-24.

(Continued)

*Primary Examiner* — Shin-Hon (Eric) Chen
(74) *Attorney, Agent, or Firm* — Finnegan, Henderson, Farabow, Garrett & Dunner, LLP (57) ABSTRACT

The present disclosure relates to a method and system for providing a pre-launched virtual desktop session by a smart scheduling server. The smart scheduling server predicts a pre-launch time to launch a virtual desktop session for a user based on a login pattern of the user monitored for a pre-defined duration, initiates a pre-launch session for the user based on the predicted pre-launch time, where the initiation comprises performing a plurality of actions for launching the virtual desktop session for the user. The smart scheduling server authenticates the user in the pre-launched initiated session based on pre-defined account credentials associated with the user, generates a security token for the user based on the authentication and provides a pre-launched virtual desktop session to the user when the user logs in to the virtual desktop session based on the security token.

15 Claims, 5 Drawing Sheets

(51) Int. Cl.
*G06F 9/451* (2018.01)
*G06F 11/30* (2006.01)
*G06F 11/34* (2006.01)
*H04L 29/08* (2006.01)
*G06F 21/62* (2013.01)

(52) U.S. Cl.
CPC ........ *G06F 11/302* (2013.01); *G06F 11/3006* (2013.01); *G06F 11/3438* (2013.01); *G06F 21/31* (2013.01); *G06F 21/629* (2013.01); *H04L 67/141* (2013.01)

(56) References Cited

U.S. PATENT DOCUMENTS

| | | | |
|---|---|---|---|
| 2015/0026306 A1* | 1/2015 | Moon | H04L 67/10 709/219 |
| 2015/0371031 A1* | 12/2015 | Ueno | G06F 21/45 726/4 |
| 2016/0055017 A1 | 2/2016 | Beveridge et al. | |
| 2016/0094622 A1* | 3/2016 | Thomas | H04L 67/10 709/203 |
| 2016/0132310 A1* | 5/2016 | Koushik | G06F 8/61 717/176 |
| 2016/0134616 A1* | 5/2016 | Koushik | H04L 63/0807 726/9 |

OTHER PUBLICATIONS

Extended European Search Report issued in the European Patent Office in counterpart European Application No. 17163803.4, dated Sep. 6, 2017, 8 pages.

\* cited by examiner

METHOD AND SYSTEM FOR PROVIDING A PRE-LAUNCHED VIRTUAL DESKTOP SESSION

FIELD OF THE INVENTION

The present subject matter is related in general to the field of virtual desktop systems, more particularly, but not exclusively to a method and system for providing a pre-launched virtual desktop session.

BACKGROUND

Virtual desktop is an interface available to an individual user in a virtualized environment. The main objective behind desktop virtualization is to separate physical machine from software and present the operating system as an isolated operating machine to the users. In recent years, desktop virtualization has been adopted by many organizations for the propose of reducing management cost. Also, desktop virtualization saves the cost as the resources used in the desktop virtualization are shared and allocated per needs of the users.

Usually, the experience of using desktop virtualization is interpreted by users based on the responsiveness of virtual desktop. In existing techniques, the responsiveness of the virtual desktops is affected by several factors such as, logon time, launch time of an application, response time of an application, session response time and so forth. Generally, whenever a new remote session is launched, many tasks are performed for launching the desktop or applications such as, loading of user profiles, group policy objects are applied, running user login scripts and so forth. These tasks lead to latency of the actual desktop and session launch and therefore gives a negative impact on the overall end user experience. For example, the latency to present actual desktop to users may be three minutes or even more. The existing techniques involve defining a time for a login and pre-launch of session by the users. However, in case the user does not login in the selected defined time, the resources utilized for launching the session would be wasted. Also, the existing pre-launch techniques are not automated or intelligent. In addition, there are two types of desktop virtualization namely, pooled virtual desktop session and persistent virtual desktop session. Existing techniques provide the prelaunch of desktops and applications for only pooled desktops.

The information disclosed in this background of the disclosure section is only for enhancement of understanding of the general background of the invention and should not be taken as an acknowledgement or any form of suggestion that this information forms the prior art already known to a person skilled in the art.

SUMMARY

The present disclosure relates to a method for providing a pre-launched virtual desktop session. The method may comprise predicting a pre-launch time to launch a virtual desktop session for a user based on a login pattern of the user monitored for a pre-defined duration, initiating a pre-launch session for the user at the predicted pre-launch time. The initiation may comprise performing a plurality of actions for launching the virtual desktop session for the user. The method may comprise authenticating the user in the pre-launched initiated session based on pre-defined account credentials associated with the user, generating a security token for the user based on the authentication and providing the pre-launched virtual desktop session to the user when the user logs in to the virtual desktop session based on the security token.

In an embodiment, the present disclosure relates to a smart scheduling server for providing a pre-launched virtual desktop session. The smart scheduling server may comprise a processor and a memory communicatively coupled to the processor, wherein the memory stores processor executable instructions, which, on execution, may cause the smart scheduling server to predict a pre-launch time to launch a virtual desktop session for a user based on a login pattern of the user monitored for a pre-defined duration, initiate a pre-launch session for the user at the predicted pre-launch time. The initiation may comprise performing a plurality of actions for launching the virtual desktop session for the user. The smart scheduling server may authenticate the user in the pre-launched initiated session based on pre-defined account credentials associated with the user, generate a security token for the user based on the authentication and provide the pre-launched virtual desktop session to the user when the user logs in to the virtual desktop session based on the security token.

In an embodiment, the present disclosure relates to a non-transitory computer readable medium including instructions stored thereon that when processed by at least one processor may cause a smart scheduling server to predict a pre-launch time to launch a victual desktop session for a user based on a login pattern of the user monitored for a pre-defined duration, initiate a pre-launch session for the user at the predicted pre-launch time, wherein the initiation may comprise performing a plurality of actions for launching the virtual desktop session for the user, authenticate the user in the pre-launched initiated session based on pre-defined account credentials associated with the user, generate a security token for the user based on the authentication and provide the pre-launched virtual desktop session to the user when the user logs in to the virtual desktop session based on the security token.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for providing a pre-launched virtual desktop session. The present disclosure may provide a smart scheduling server which provides an improved virtual desktop user experience through a pre-launch of a session. In an embodiment, the pre-launched session may be provided for both pooled and for persistent virtual desktops. The smart scheduling server pre-launches the user session before the user launches the desktop or an application. A pre-launch time for launching the virtual desktop session for a user is predicted based on a login pattern of the user which is monitored for a pre-defined duration. Once the pre-launch time is predicted, a pre-launch session is initiated for the user and the user in the pre-launched initiated session is authenticated based on a pre-defined account credentials associated with the user. The initiation may comprises performing a plurality of actions for launching the virtual desktop session such as, loading of a user profile, loading a pre-login script, performing pre-login steps in a sequence for each user etc. The smart scheduling server may generate a security token the user based on the authentication of the pre-defined account credentials of the user. The pre-launched virtual desktop session may be provided to the user when the user logs in to the virtual desktop session based on the security token. In an embodiment, the pre-launched initiated session remains in active state. Whenever the user logs in to the virtual desktop session, since the pre-launched initiated session is in active state, the user may be authenticated using the generated security token and the session may be provided to the user instantly without any delay.

Figure 1:
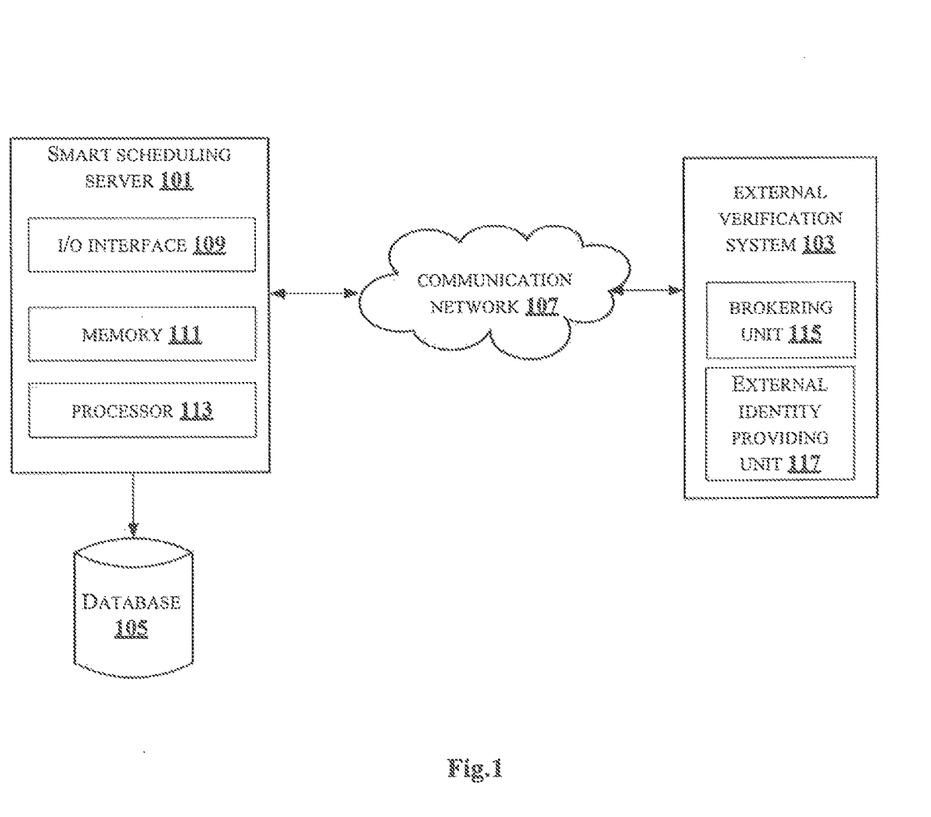
FIG. 1 illustrates an exemplary environment for providing a pre-launched virtual desktop session in accordance with some embodiments of the present disclosure.

FIG. 1 illustrates an exemplary environment for providing a pre-launched virtual desktop session in accordance with some embodiments of the present disclosure.

As shown in FIG. 1, the environment 100 comprises a smart scheduling server 101 and an external verification system 103 connected through a communication network 107. The smart scheduling server 101 may also be connected to a database 105. The smart scheduling server 101 predicts a pre-launch time for launching a virtual desktop session and provides the pre-launched session to users. The external verification system 103 comprises a brokering unit 115 and an external identity providing unit 117. The external verification system 103 may validate users of a virtual desktop session. In an embodiment, the brokering unit 115 may allow users to access virtual desktop and applications. In an embodiment, the brokering unit 115 may perform tasks including, but not limited to, checking user entitlements, assigning users to virtual desktop and so forth. A person skilled in the art would understand that any other tasks may also be performed in the present disclosure. In an embodiment, the external identity providing unit 117 is a trusted entity which may be responsible for validating and authenticating identity of the users. In an embodiment, the external identity providing unit 117 may comprise user account credentials of each user. Typically, there may be a single external identity providing unit for an organization. In an embodiment, the smart scheduling server 101 may include, but are not limited to, a laptop, a desktop computer, a Personal Digital Assistant (FDA), a notebook, a smartphone, a tablet and any other computing devices. In an embodiment, a pre-launched session may be provided for both pooled and persistent virtual desktop. Further, to provide a pre-launched session to a user, the smart scheduling server 101 may initially predict a pre-launch session time for launching a virtual desktop session for the user. The pre-launch session time may be predicted based on a login pattern of the user which is monitored for a pre-defined duration. The smart scheduling server 101 initiates a pre-launch session for the user based on the predicted pre-launch time. In an embodiment, the pre-launch session may be initiated before the user logs in to the virtual desktop session. Further, the initiation comprises performing a plurality of pre-defined actions for launching the virtual desktop session for the user. In an embodiment, the plurality of predefined actions may include, but not limited to loading of user profile, loading pre-login script, performing pre-login steps in a sequence for each user etc. Once the pre-launch session is initiated, the smart scheduling server 101 authenticates the user based on a pre-defined account credentials associated with the user. In an embodiment, the pre-defined account credentials are created for each user and stored in the database 105. The database 105 may also store the predicted pre-launch time for multiple users. In some embodiment, the data stored in the database 105 may be stored in the memory of the smart scheduling server 101. The smart scheduling server 101 may authenticate the pre-defined account credentials of the user and may generate a security token based on a authentication. In an embodiment, the pre-defined account credentials comprise actual user identification and an alternative password. Further, once the user logs in to the virtual desktop session using the actual user credentials, the smart scheduling server 101 provides the pre-launched virtual desktop to the user based on the security token generated. In an embodiment, the smart scheduling server 101 disconnects the pre-launched virtual desktop session whenever the user login is delayed for a pre-defined time after the pre-launch time.

The smart scheduling server 101 comprises an Interface 109, a memory 111 and a processor 113. The I/O interface 109 may be configured to receive user credentials from the user. The I/O interface 109 may also receive pre-defined account credentials of the user from the database 105.

The received information from the I/O interface 109 is stored in the memory 111. The memory 111 is communicatively coupled to the processor 113 of the smart scheduling server 101. The memory 111 also stores processor instructions which cause the processor 113 to execute the instruction for providing the pre-launched virtual desktop session.

Figure 2:
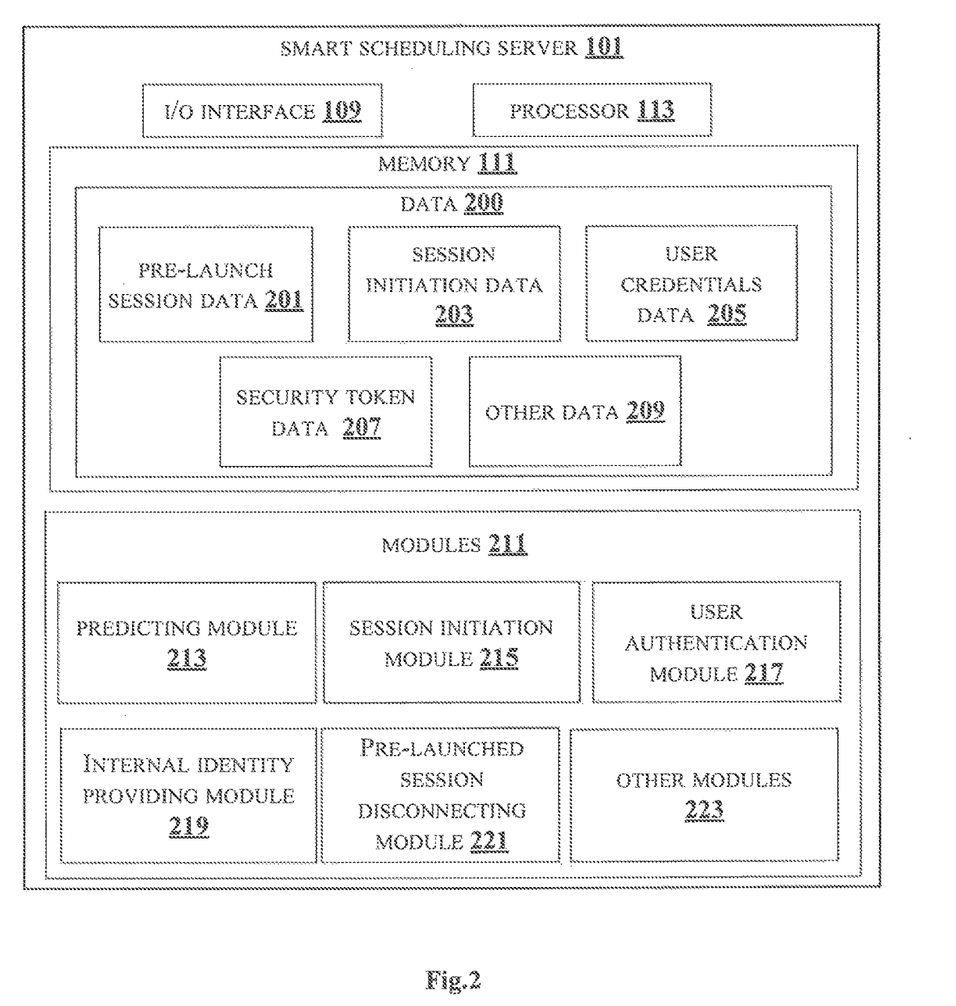
FIG. 2 shows a detailed block diagram of a smart scheduling server in accordance with some embodiments of the present disclosure.

FIG. 2a shows a detailed block diagram of a smart scheduling server in accordance with some embodiments of the present disclosure.

Data 200 and one or more modules 211 of the smart scheduling server 101 are described herein in detail. In an embodiment, the data 200 comprises pre-launch session data 201, session initiation data 203, user credentials data 205, security token data 207 and other data 209.

The pre-launch session data 201 may comprise details about login patterns associated with each user. The login patterns may comprise access history of the user for login and launching the virtual desktop session. The login patterns of the user may be monitored for the pre-defined time duration to predict the pre-launch time for the user. In an embodiment, the pre-launch time for launching the virtual desktop session may be set at some time before the predicted pre-launch time. For example, the pre-launch time may be set 30 minutes before the predicted time of the user launching time.

The session initiation data 203 may comprise details about pre-login tasks. The pre-login tasks may comprise the plurality of actions associated with launching the virtual desktop session. The plurality of actions may include, but are not limiting to, loading of the user profile, loading of pre-login scripts, performing pre-login steps in a sequence for each user etc.

The user credentials data 205 may comprise the actual user identification associated with user and the alternative password. The alternative password may be pre-defined by the smart scheduling server 101 for each user. In an embodiment, a user authentication process may be simulated based on the actual user identification and the alternative password.

The security token data 207 may comprise details about the security token generated for the user. The security token may be used for providing the virtual desktop session to the user on authentication of the user account credentials.

The other data 209 may store data, including temporary data and temporary files, generated by modules for performing the various functions of the smart scheduling server 101.

In an embodiment, the data 200 in the memory 111 are processed by the one or more modules 211 of the smart scheduling server 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 211 may include, but are not limited to, a predicting module 213, a session initiation module 215, a user authentication module 217, an internal identity providing module 219, and a pre-launched session disconnecting module 221. The one or more modules 211 may also comprise other modules 223 to perform various miscellaneous functionalities of the smart scheduling server 101. It will be appreciated that such modules may be represented as a single module or a combination of different modules.

The predicting module 213 may predict the pre-launch time for launching the virtual desktop session for the user. The predicting module 213 predicts the pre-launch time based on the login pattern of the user which may be monitored for the pre-defined duration. The predicting module 213 may fetch past login time of the user stored in the database 105 for predicting the pre-launch time. The database 105 stores the past login time at which the user logs in to the virtual desktop session and resource configuration details of each user. The past login data of the user may indicate different user log in time for the virtual desktop session. For example, first login time of the user during a day and multiple login time for the user during the day. The predicting module 213 may analyse the login patterns of the user and predict the pre-launch time.

The session initiation module 215 may initiate the pre-launch session for the user at the predicted pre-launch time. Based on the predicted pre-launch time, the session initiation module 215 initiates the virtual desktop session for the user. The initiation of the pre-launch session may comprise actions including, but not limited to, performing the plurality of actions such as, loading of the user profile, loading of the pre-login script, performing pre-login steps in a sequence for each user etc. In an embodiment, the session initiation module 215 fetches the user and respective resource configuration data such as, operating system details of user, pooled/persistent desktop and so forth, from the database 105. A person skilled in the art would understand that any other type of resource configuration data can be used with the present disclosure. Further, the session initiation module 215 may receive the security token from the brokering unit 117 of the external verification system 105 on authentication of the accounts credentials entered by the user. On receiving the security token, the session initiation module 215 may provide the pre-launched session to the user.

The user authentication module 217 may simulate authentication for the user for the pre-launched initiated session by using the pre-defined account credentials of the user. The pre-defined account credentials of the user are already stored in the database 105. The user authentication module 217 may pass the pre-defined user account credentials to an internal identity providing module 219 for verification.

The internal identity providing module 219 may validate the pre-defined account credentials of the user received from the user authentication module 217. On validation, the internal identity providing module 219 may generate the security token for the user and may pass the security token to the user authentication module 217.

The pre-launched session disconnecting module 221 may disconnect the pre-launch session in case the user does not login in a predefined time. In an embodiment, the disconnection of the pre-launched session avoids resource data wastage in the virtual desktop session.

Figure 3:
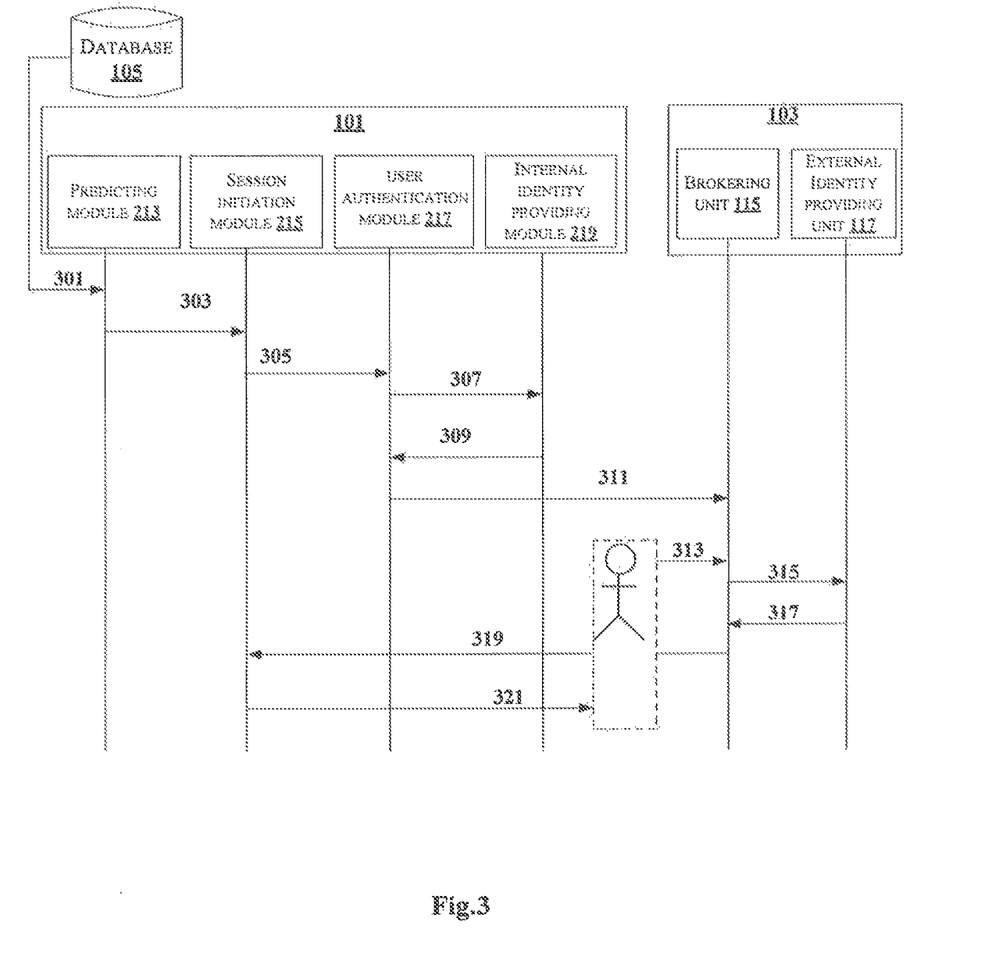
FIG. 3 illustrates a sequence diagram for providing a pre-launched virtual desktop session to a user in accordance with some embodiment of the present disclosure.

FIG. 3 illustrates a sequence diagram for providing a pre-launched virtual desktop session to a user in accordance with some embodiments of the present disclosure.

The sequence diagram shows the steps for providing a pre-launched virtual desktop session to user whenever a user logs in to a virtual desktop session.

At 301, the predicting module 213 fetches past user login details from the database 105. The predicting module 213 may predict a login time for the user based on the past user login details. On predicting the login time for the user, the predicting module 213 may determine the pre-launch time for launching the virtual desktop session. The pre-launch time may be set at a pre-defined time before the predicted login time of the user.

At 303, the session initiation module 215 may receive the pre-launch time and initiate the pre-launch session for the user. The initiation of the pre-launch session may comprise performing the plurality of actions for launching the virtual desktop session of the user. The plurality of actions may include, but are not limited to, loading of the user profile, loading the pre-login script and performing pre-login steps in a sequence for each user.

At 305, once the pre-launch session is initiated, the authentication module 217 may receive the pre-defined account credentials of user from the session initiation module 215 for authentication. The pre-defined account credentials are created for each user as a shadow account information.

At 307, the user authentication module 217 may send the pre-defined account credentials of the user to the internal identity providing module 219 for validation. The internal identity providing module 219 may validate the user based on the received pre-defined account credentials of the user and may generate the security token for the user.

At 309, the internal identity providing module 219 may provide the generated security token to the user authentication module 217 on validation.

At 311, the user authentication module 217 may send the security token received from the internal identity providing module 219 to the brokering unit 115 of the external verification system 103.

At 313, user logs in to the virtual desktop session by providing actual user identification and a password. The user identification and the password are received by the brokering unit 115 of the external verification system 103.

At 315, the brokering unit 115 may share the actual user identification and the password provided by the user to the external identity providing unit 117 for authentication.

At 317, the external identity providing unit 117 may authenticate the user by validating the actual user identification and the password provided by the brokering unit 115 with the stored user identification and the password. On authentication, the identity providing unit 117 may provide a notification to the brokering unit 115.

At 319, the brokering unit 115 may provide the security token received from the user authentication module 217 to the session initiation module 215 on receiving notification on authentication.

At 321, on receiving the security token, the session initiation module 215 may provide the pre-launched virtual desktop session to the user.

Figure 4:
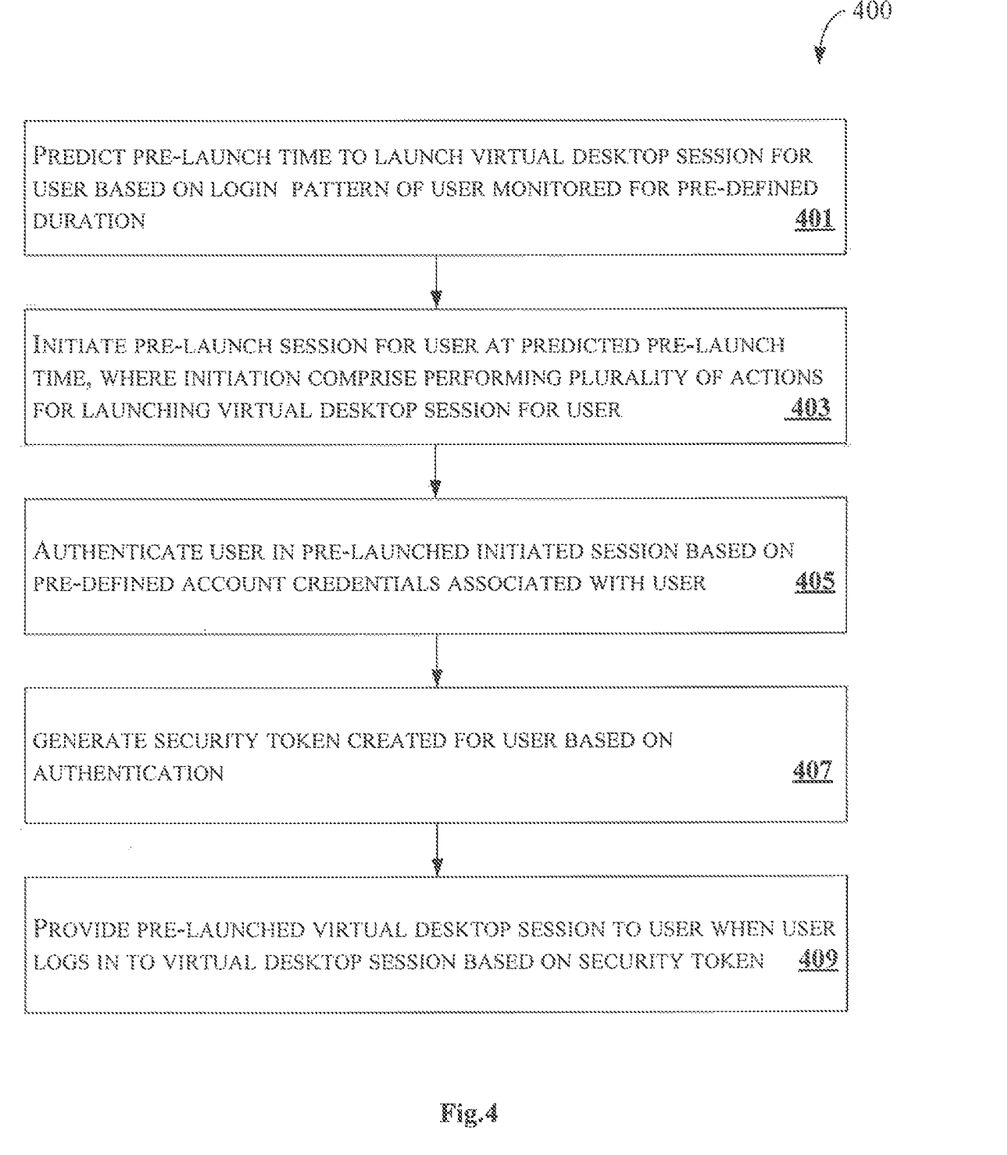
FIG. 4 illustrates a flowchart showing a method for providing a pre-launched virtual desktop session in accordance with some embodiments of present disclosure.

FIG. 4 illustrates a flowchart showing a method for providing a pre-launched virtual desktop session in accordance with some embodiments of present disclosure.

As illustrated in FIG. 4, the method 400 comprises one or more blocks for providing a pre-launched virtual desktop session. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein, furthermore, the method can be implemented in any suitable hardware, software, firmware, or combination thereof.

At block 401, the smart scheduling server 101 may predict the pre-launch time for launching the virtual desktop session for the user based on the login pattern of the user monitored for a pre-defined duration.

At block 403, the smart scheduling server 101 may initiate the pre-launch session for the user at the predicted prelaunch time. The initiation may comprise performing a plurality of actions for launching the virtual desktop session for the user.

At block 405, the smart scheduling server 101 may authenticate the user in the pre-launched initiated session based on pre-defined account credentials associated with the user.

At block 407, the smart scheduling server 101 may generate the security token for the user based on authentication.

At block 409, the smart scheduling, server 101 may provide the pre-launched virtual desktop session to the user when the user logs in to the virtual desktop session based on the security token.

Computing System

Figure 5:
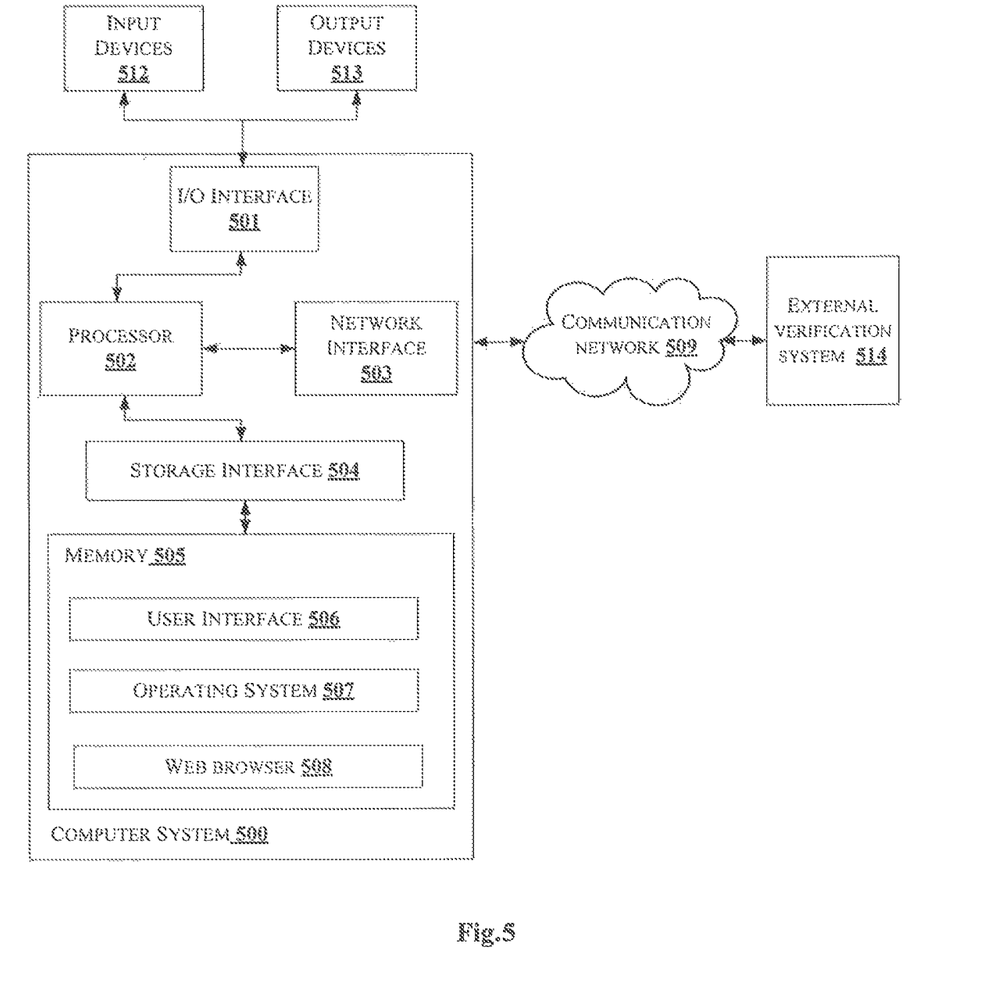
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the smart scheduling server 101. The computer system 500 may comprise a central processing unit ("CPU" or "processor") 502. The processor 502 may comprise at least one data processor for providing a pre-launched virtual desktop session. The processor 50, may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monnaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WIMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a smart scheduling server 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internal protocol (TCP/IP), token ring, IEEE 802.11a/b/g/mix, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with an external verification system 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc, employing connection protocols such as, serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as, the data, variables, records, etc., as described in this disclosure. Such databases may be implemented as fault-tolerant, relational, scalable, secure databases such as, Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc,), Linux distributions (e.g., Red Hat, Ubuntit, Kuburitit, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as, Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as, AJAX, DHTML, Adobe Flash, JavaScript, Java, Application Programming Interfaces (APIs), etc. In some embodiments, the computer system 500 may implement a mail server stored program component. The mail server may be an Internet mail server such as, Microsoft Exchange, or the like. The mail server may utilize facilities such as, ASP, ActiveX, ANSI C++/C#, Microsoft .NET, CGI scripts, Java, JavaScript, PERL, PHP, Python, WebObjects, etc. The mail server may utilize communication protocols such as, Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as, Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure improves user experience while accessing any virtual desktop session.

An embodiment of the present disclosure reduces latency involved while accessing the virtual desktop session and login processes.

An embodiment of the present disclosure provides predictive pre-launch session for pooled and persistent desktops.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as, magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one devicelartiele (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Smart scheduling server |
| 103 | External verification system |
| 105 | Database |
| 107 | Communication network |
| 109 | I/O interface |
| 111 | Memory |
| 113 | Processor |
| 115 | Brokering unit |
| 117 | External identity providing unit |
| 200 | Data |
| 201 | Pre-launch session data |
| 203 | Session initiation data |
| 205 | User credentials data |
| 207 | Security token data |
| 209 | Other data |
| 211 | Modules |
| 213 | Predicting module |
| 215 | Session initiation module |
| 217 | User authentication module |
| 219 | Internal identity providing module |
| 221 | Pre-launched session disconnecting module |
| 223 | Other modules |

What is claimed is:

1. A method for providing a pre-launched virtual desktop session, the method comprising:
predicting, by a smart scheduling server, a pre-launch time to launch a virtual desktop session for a user based on a login pattern of the user monitored for a predefined duration;
initiating, by the smart scheduling server, the pre-launched virtual desktop session for the user based on the predicted pre-launch time, wherein the initiation of the pre launched virtual desktop session comprises:
  loading of user profile, loading pre-login script and performing pre-login steps in a sequence for each user, at the predicted pre-launch time before a predicted login time of the user;
authenticating, by the smart scheduling server, the user in the initiated pre-launched virtual desktop session based on pre-defined account credentials associated with the user;
generating, by the smart scheduling server, a security token for the user based on the authentication, wherein the security token is used to provide the virtual desktop session to the user when the user logs in to the virtual desktop session; and
disconnecting, by the smart scheduling server, the pre-launched virtual desktop session when the user login is delayed for a pre-defined time after the pre-launch time.

2. The method as claimed in claim 1, wherein the pre-launched virtual desktop session is initiated before the user logs in to the virtual desktop session.

3. The method as claimed in claim 1, wherein the pre-defined account credentials comprise actual user identification and an alternative password.

4. The method as claimed in claim 1 further comprising receiving a notification from an external verification system upon authentication of the user when the user logs in to the virtual desktop session.

5. The method as claimed in claim 1 further comprising providing, by the smart scheduling server, the pre-launched virtual desktop session to the user when the user logs in to the virtual desktop session based on the security token.

6. A smart scheduling server for providing a pre-launched virtual desktop session, comprising:
  a processor; and
  a memory communicatively coupled to the processor, wherein the memory stores processor instructions, which, on execution, causes the processor to:
    predict a pre-launch time to launch a virtual desktop session for a user based on a login pattern of the user monitored for a predefined duration;
    initiate the pre-launched virtual desktop session for the user based on the predicted pre-launch time, wherein the initiation of the pre-launched virtual desktop session comprises:
      loading of user profile, loading pre-login script and performing pre-login steps in a sequence for each user, for launching the virtual desktop session for the user before a predicted login time of the user;
    authenticate the user in the initiated pre-launched virtual desktop session based on pre-defined account credentials associated with the user;
    generate a security token for the user based on the authentication, wherein the security token is used to provide the virtual desktop session to the user when the user logs in to the virtual desktop session; and
    disconnect the pre-launched virtual desktop session when the user login is delayed for a pre-defined time after the pre-launch time.

7. The smart scheduling server as claimed in claim 6, wherein the processor is configured to initiate the pre-launched virtual desktop session before the user logs in to the virtual desktop session.

8. The smart scheduling server as claimed in claim 6, wherein the pre-defined account credentials comprise shadow user identification and a password.

9. The smart scheduling server as claimed in claim 6, wherein the processor is configured to receive a notification from an external verification system upon authentication of the user when the user logs in to the virtual desktop session.

10. The smart scheduling server as claimed in claim 6, wherein the processor is configured to provide the pre-launched virtual desktop session to the user when the user logs in to the virtual desktop session based on the security token.

11. A non-transitory computer readable medium including one or more instructions stored thereon that when processed by at least one processor cause a smart scheduling server to perform operation comprising:
  predicting a pre-launch time to launch a virtual desktop session for a user based on a login pattern of the user monitored for a pre-defined duration;
  initiating a pre-launched virtual desktop session for the user based on the predicted pre-launch time, wherein the initiation of the pre-launched virtual desktop session comprises:
    loading of user profile, loading pre-login script and performing pre-login steps in a sequence for each user, for launching the virtual desktop session for the user before a predicted login time of the user;
  authenticating the user in the initiated pre-launched virtual desktop session based on pre-defined account credentials associated with the user;
  generating a security token for the user based on the authentication, wherein the security token is used to provide the pre-launched virtual desktop session to the user when the user logs in to the virtual desktop session; and
  disconnecting the pre-launched virtual desktop session when the user login is delayed for a pre-defined time after the pre-launch time.

12. The medium as claimed in claim 11, wherein the one or more instructions cause the processor to initiate the pre-launched virtual desktop session before the user logs in to the virtual desktop session.

13. The medium as claimed in claim 11, wherein the pre-defined account credentials comprise actual user identification and an alternative password.

14. The medium as claimed in claim 11, wherein the one or more instructions cause the processor to receive a notification from an external verification system upon authentication of the user when the user logs in to the virtual desktop session.

15. The medium as claimed in claim 11, wherein the one or more instructions cause the processor to provide the pre-launched virtual desktop session to the user when the user logs in to the virtual desktop session based on the security token.

* * * * *